Patented Sept. 10, 1929.

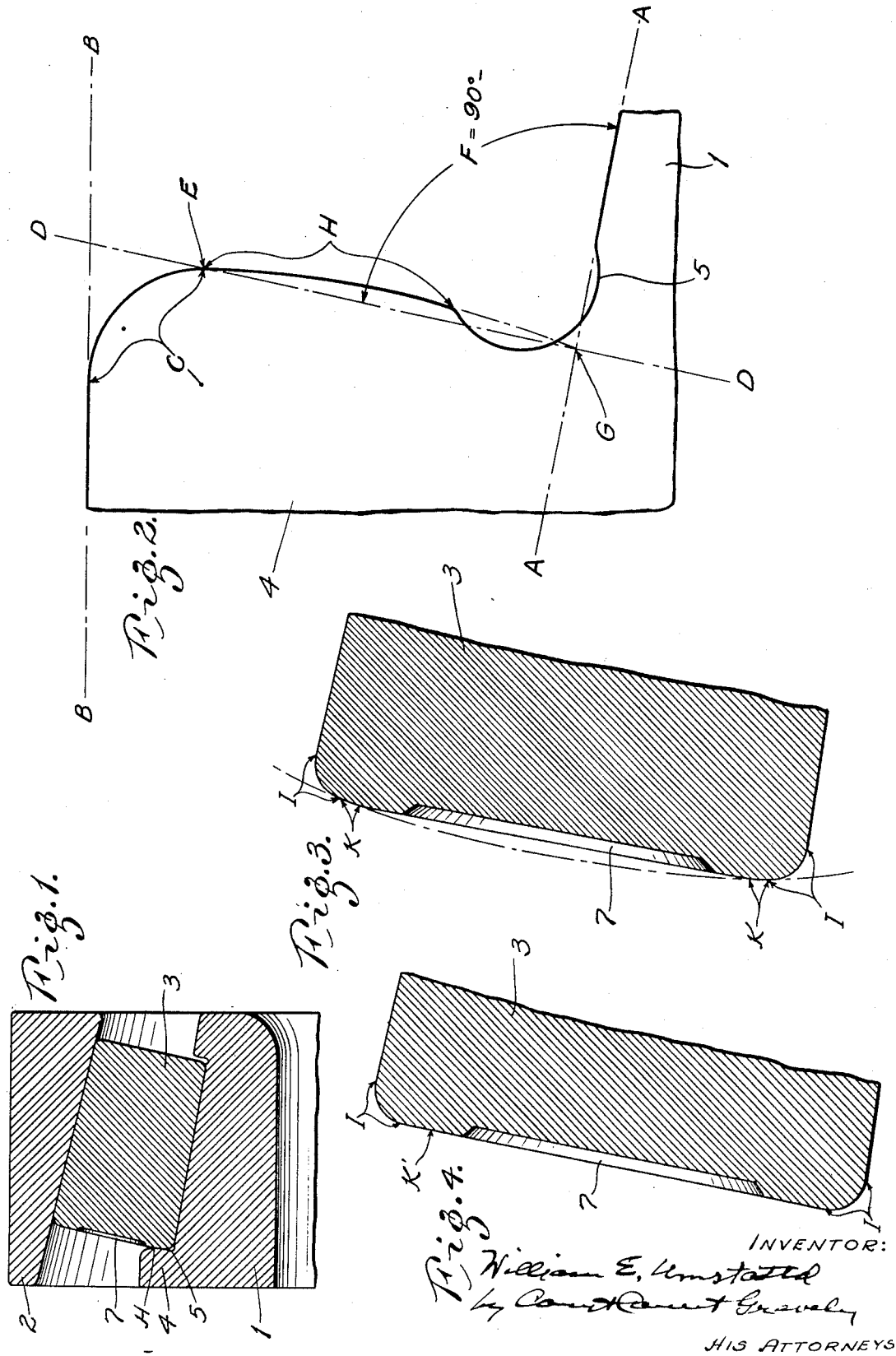

1,727,576

UNITED STATES PATENT OFFICE.

WILLIAM E. UMSTATTD, OF CANTON, OHIO, ASSIGNOR TO THE TIMKEN ROLLER BEARING COMPANY, OF CANTON, OHIO, A CORPORATION OF OHIO.

ROLLER BEARING.

Application filed May 5, 1927. Serial No. 188,997.

This invention relates to roller bearings and particularly to roller bearings of the type illustrated in U. S. patent to Neal No. 1,258,634, dated March 5, 1918. Bearings of this type have important advantages but, on account of the nature of the contact between the large ends of the rollers and the thrust rib of the cone, the lubrication thereof is unsatisfactory and there is a tendency for the roller and the rib to wear more rapidly than is desirable. The principal object of the present invention is to provide for satisfactory lubrication and reduce wear and still obtain advantages characteristic of the Neal type of bearing. The invention consists principally in shifting the points of contact of the Neal type of bearing so that the contact points of the cone will be closer to the axis of the cone and the contact points of each roller will be closer to the axis of such roller with relation to the position of the points of contact shown in the Neal patent for rollers and ribs of equal size. It also consists in a roller whose thrust end is provided with an annular thrust rib of convexly curved section; it also consists in a bearing member provided with an annular thrust rib whose thrust receiving portion is of convexly curved section; it also consists in the parts and in the combination and arrangement of parts hereinafter described and claimed.

In the accompanying drawing, which forms part of this specification and wherein like reference numerals indicate like parts wherever they occur, Fig. 1 is a longitudinal sectional view of a bearing embodying my invention;

Fig. 2 is an enlarged view of the thrust rib of the bearing cone and the adjacent raceway portion thereof;

Fig. 3 is an enlarged sectional view of the thrust end of a roller having a crowned ring; and Fig. 4 is a view similar to Fig. 3 showing a modified roller having a flat contact band.

The present bearing comprises a cone or inner raceway member 1 and a cup or outer raceway member 2 of common construction concentric with said cone, and a series of conical rollers 3 interposed between the cup and the cone. The cone has a thrust rib 4 at its large end; and except for the usual groove 5 at the base of the rib, the face of said rib is convexly curved longitudinally of the axis of the cone, thereby crowning the thrust surface of said rib.

For theoretical purposes, the surface of the thrust rib illustrated in the drawing may be designed as follows: First lay off a line A—A representing an element of the radial bearing surface of the cone as desired, together with the usual groove 5 at the base of the rib and a line B—B representing the outer surface of the thrust rib. Then radius or round off the outer edge of the rib with a curve C of short radius; and then draw a line D—D from the inner margin E of such radiused edge at an angle F slightly less than a right angle to said element A—A (projected) of the bearing surface of the cone. The portion of this last mentioned line D—D between its intersection E with the inner margin of the radiused edge and its intersection G with the extended element A—A of the bearing surface of the cone is the chord of an arc of larger curvature than that of the radiused edge; and with the portion H of this arc beyond the groove 5 as a radius vector revolving about the axis of the cone, it will describe the bearing face of the thrust rib as a surface of revolution. In longitudinal section, this surface is convexly curved or crowned. The radiused edge has a curvature of relatively short radius, while the crowned portion has a curvature of relatively long radius, but the two surfaces join at a point E of common tangency and thus coalesce, or they join at a very oblique angle that may be readily rounded off or eliminated by "stoning" or otherwise.

In the construction illustrated in Fig. 3, the large end of the roller has its edge radiused with a curve I of relatively short radius. Inside of this radiused edge said large end of the roller is provided with an annular band or rib K of longitudinally convex section, the curvature of the band being of larger radius than the curvature of the radiused edge portion and the two curves having a common tangent where they meet and therefore coalescing without forming an angle or ridge between them. The curvature of the annular band or rib K is of such long radius as to amount merely to a crowning of the thrust portion of the end of the roll, and a central depression or recess 7 is formed inside of such annular rib or band.

When the thrust portions of the cone rib and of the end of each roller are both crowned, as hereinbefore described, the contact between the end of each roller and the thrust rib is always between longitudinally convexly curved surfaces, namely, between the two crowned bands H and K; and the points of contact are away from the edges and located where they are best capable of resisting stress. Although, in the present construction, the points of contact are located inwardly from the outer surfaces of the rollers and of the thrust rib, the two points of contact for each roller are far enough apart to make the rollers self-alining after the manner of the Neal patent, and where they tend to eliminate to a large extent the cutting and abrading action that tends to shorten the life of the Neal bearing. At the same time, the curvatures of the surfaces of the bands of contact H and K of the thrust rib and of the end of the roll together with the central recess 7 therein cooperate effectively to keep such surfaces well lubricated; and thus also tend to prolong the life of the bearing.

While I have described the thrust rib of the cone as having its bearing face crowned and the thrust end of the roller as being provided with a crowned band or rib, it is practicable to dispense with the crowning of either one or the other of these cooperating parts. In such case, I consider it preferable to crown the thrust rib and as shown in Fig. 4, form the thrust end of the roller with a plane surface $K^1$ surrounding the central recess and tangent to or merging into the curve of the radiused edge. It is feasible, however, to make the thrust rib with an uncrowned conical surface and to form the end of the roller with an annular band or rib convexed in such manner that the convex portion of such rib will bear against the conical surface of said thrust rib.

What I claim is:

1. A roller bearing comprising a bearing cone having a thrust rib at its large end, a bearing cup, and a series of headless rollers between said cone and said cup, the end of each roller contacting endwise against said thrust rib at only two points spaced apart and located inwardly from the edge of the roller, and one of the contacting surfaces being convexly curved in longitudinal section through each point of contact.

2. A roller bearing comprising a bearing cone having a thrust rib at its large end, a bearing cup, and a series of headless rollers between said cone and said cup, the bearing surface of said thrust rib being an annular band located inwardly from the edge of said rib and convexly curved in cross section and the bearing face of said rib being slightly undercut, whereby the end of each roller will bear against such convexly curved surface at only two points spaced apart.

3. A roller bearing comprising a bearing cone having a thrust rib at its large end, a bearing cup, and a series of headless rollers between said cone and said cup, the bearing surface of said thrust rib being located inwardly from the outer periphery of said rib and being convexly curved in cross section and being slightly undercut, each roller having an annular band of convexly curved section at the end thereof inwardly from its edge adapted to contact with said thrust rib at only two points spaced apart.

4. A roller bearing comprising a bearing cone having a thrust rib at its large end, a bearing cup, and a series of headless rollers between said cone and said cup, the end of each roller contacting endwise against said thrust rib at only two points spaced apart, the bearing face of said thrust rib being a convex surface of revolution generated by a curve consisting of an outer arc of short radius and an inner arc of long radius coalescing therewith, the chord of said last mentioned arc making approximately a right angle with an element of the bearing surface of said cone.

5. A roller bearing comprising a bearing cone having a thrust rib at its large end, a bearing cup, and a series of headless rollers between said cone and said cup, the end of each roller contacting endwise against said thrust rib at only two points spaced apart, the bearing face of said thrust rib being a convex surface of revolution generated by a curve consisting of an outer arc of short radius and an inner arc of long radius coalescing therewith, the chord of said last-mentioned arc making an angle slightly less than a right angle with an element of the bearing surface of said cone.

Signed at Canton, Ohio, this 25th day of April, 1927.

WILLIAM E. UMSTATTD.